United States Patent
Seto

[11] Patent Number: 5,884,920
[45] Date of Patent: Mar. 23, 1999

[54] INFANT CARRIER FOR ROUGH TERRAIN

[76] Inventor: Peter A. Seto, 8160 SW. Brookridge, Portland, Oreg. 97225

[21] Appl. No.: 706,375

[22] Filed: Aug. 30, 1996

Related U.S. Application Data

[63] Continuation of Ser. No. 328,804, Oct. 25, 1994, abandoned.

[51] Int. Cl.$^6$ ....................................................... B62B 1/12
[52] U.S. Cl. ............................ 280/1.5; 280/30; 280/658; 280/47.3; 280/47.315; 280/78
[58] Field of Search ............................. 280/1.5, 30, 7.17, 280/202, 288.4, 78, 657, 658, 648, 652, 654, 655, 47.131, 47.2, 47.3, 47.31, 47.315, 47.32, 47.33; 224/32 A, 32 R, 33 R, 31, 39.4; 74/543, 551.1, 551.3; D3/31

[56] References Cited

U.S. PATENT DOCUMENTS

| | | | |
|---|---|---|---|
| 2,235,041 | 3/1941 | Ronning | 280/47.31 |
| 2,395,275 | 2/1946 | Jackson | 280/648 |
| 2,498,663 | 2/1950 | Easley | 224/33 R |
| 2,798,727 | 7/1957 | Jensen et al. | 280/7.17 |
| 2,983,520 | 5/1961 | Klages | 280/DIG. 2 |
| 3,236,537 | 2/1966 | Eckman | 280/47.3 |
| 3,456,959 | 7/1969 | Hemphill et al. | 280/47.3 |
| 3,560,015 | 2/1971 | Tracy | 280/47.3 |
| 3,820,807 | 6/1974 | Curran | 280/47.3 |
| 3,829,113 | 8/1974 | Epelbaum | 280/30 |
| 4,055,354 | 10/1977 | Sharpe | 280/47.31 |
| 4,179,828 | 12/1979 | Brunty | 280/47.32 |
| 4,284,286 | 8/1981 | Lewallen | 280/47.2 |
| 4,313,611 | 2/1982 | Heinze | 280/63 |
| 4,410,116 | 10/1983 | Mattei | 224/33 R |
| 4,444,405 | 4/1984 | Barrus | 280/78 |
| 4,848,780 | 7/1989 | Straub | 280/1.5 |
| 4,869,517 | 8/1989 | Smith | 280/47.3 |
| 5,005,845 | 4/1991 | Haueter, Jr. | 280/1.5 |
| 5,040,807 | 8/1991 | Snover | 280/47.31 |
| 5,062,651 | 11/1991 | Varieur | 280/1.5 |
| 5,195,394 | 3/1993 | Latta | 280/288.4 |
| 5,234,143 | 8/1993 | Mahvi | 224/31 |
| 5,511,802 | 4/1996 | Aitken | 280/1.5 |

FOREIGN PATENT DOCUMENTS

| 0044932 | 4/1977 | Japan | 280/1.5 |
|---|---|---|---|

*Primary Examiner*—Anne Marie Boehler

[57] ABSTRACT

A vehicle for transporting loads over rough terrain having a seat mounted on a bracket which is mounted on a frame which rides on a single wheel carried within a fork. A handlebar with vertical handgrips provides control in a variety of positions in use, and a pair of normally retracted wheels which can be extended to stabilize the vehicle. The vehicle is adjustable in length, wheel size, handlebar size and presentation, load size, angle, and center-of-gravity relative to the wheel, and the number of wheels in contact with the ground.

13 Claims, 4 Drawing Sheets

INFANT CARRIER FOR ROUGH TERRAIN

This application is a continuation of application Ser. No. 08/328,804, filed 25 Oct. 1994, now abandoned.

BACKGROUND AND SUMMARY OF THE INVENTION

The field of the invention is a vehicle which is tiltable, stabilized by the attendant, hand-propelled, with a single wheel, and as above with receptacle, and, child carrier, user propelled.

The present invention relates to a carrier for the transportation of a light load, and in particular an infant, over rough trails and while jogging including a seat and a bracket mounted on a frame and a single wheel, which are adjustable relative to each other, and an improved handle which is adjustable relative to the frame.

A light carrier that will substitute directly for a backpack, both for loads, and for carrying children, in town and while camping, jogging or walking outdoors, is needed as our population ages. By careful design, my invention meets all of these needs in one device.

Previously known carts for carrying loads over rough terrain have failed to gain wide popularity. None revealed to date has a seat for a child, and most have many parts which add weight and complexity.

All jogging carriages such as are revealed in U.S. Pat. Nos. 5,062,651, 4,848,780, and 3,829,113 are designed for use on smooth, usually paved, surfaces. None revealed to date can be used on trails safely.

U.S. Pat. Nos. 4,055,354 and 3,820,807 reveal carts designed to allow the transporting of heavy loads by two users, and U.S. Pat. Nos. 5,005,845, 4,869,517, and 3,560, 015 reveal vehicles which are designed to be used by one person carrying lighter loads. These carts are difficult to use and tiring because they cannot be pushed or controlled easily. The load is carried between the wheel and the user, and some weight is carried by the user's arms or torso.

None of these vehicles are adjustable for the size of the user. The distance from handle to wheel and the angle of the load on the wheel need to be variable to compensate for varying heights of user.

None of these vehicles is adjustable for stride length. Tall users have a longer stride and need to have the wheel placed farther away from the handle than shorter users. The same user will need a longer vehicle while running in the city than when walking on a trail, because stride length varies with speed. None of these vehicles is adjustable for a variety of wheel sizes.

U.S. Pat. No. 5,005,845 reveals a pole for carrying loads outdoors. This design sacrifices control, both for steering and for stabilizing the vehicle, for simplicity and lightness.

Lacking a handle, it cannot be controlled around the axis of the pole because the hand grip can produce no significant torsional moment, so it is directionally unstable. Any imbalance of loads around the pole, such as is produced by single, indivisible loads like an infant, produces a torque that overwhelms that produced by the hand. A chair might be mounted to it rigidly, but it would twist to be lowermost on the pole, and the apparatus would not be steerable nor the ride pleasant for the child. Only a small wheel can be used, because a larger wheel will produce proportionately larger twisting moments, and the hand, lacking any mechanical advantage, will be unable to provide a correcting torque.

Because of this limitation of wheel size, the vehicle can be used outdoors, but only on smooth surfaces such as an ice-covered pond. Pushing the vehicle over uneven ground results in frequent and painful punches to the throat and chin, even if the wheel is significantly larger than in this embodiment.

This is a shortcoming of all of the carts or poles which contact the body or are tied mechanically to it. The movement of any vehicle over uneven ground produces a constant series of jolts and pulls which are translated directly into the body through the point of contact. Placing the end of the rigid pole against the user's torso would be extremely unpleasant over even moderate terrain, the effect approximating an engine pushrod.

The pole can only be pushed, not towed.

The patents revealing child-carriers found to date, U.S. Pat. Nos. 5,062,651, and 4,848,780 disclose carriers which use two or three wheels to support the chair. They show vehicles which are designed to be statically stable. This approach has proven unworkable on trails where they are unable to remain upright on sloping or uneven ground. These vehicle are too wide, and they are also heavy and cannot be easily lifted over large obstacles in the pathway.

The child faces forward and is hit by branches intruding into the pathway as the vehicle advances.

The vehicle can only be towed, not pushed. The trailing position can be dangerous, in part because the vehicles cannot be actively stabilized by the user, and upsets can occur without warning.

In these carriers the child is not visible to the user and cannot interact with the user. Infants often drop their bottles or clothing over the side. and in tow, this is not visible.

The carriages shown conform to the slope of the terrain with both wheels, so the child is rocked excessively side to side on variable terrain as one wheel rises and falls relative to the other.

The previously revealed vehicles are wide and long and have many parts which add weight and complexity. A vehicle generally should not be wider than six inches at the ground for easy use on a trail. A vehicle that is too long cannot turn across switch-backs or maneuver around rocks or in dense undergrowth.

Whatever the precise merits, features, and advantages of the above cited references, none of them achieves or fulfills the purpose of the carrier, with detachable seat, of the present invention.

SUMMARY OF THE INVENTION

It is an object of the invention to provide a wheeled apparatus that is more maneuverable, narrower and shorter, lighter, with fewer parts, safer in use, and more economical to manufacture than prior devices, and is pushed or pulled by one user.

It is an object of the invention to provide a single vehicle which is easily adapted to carry an infant and a wide variety of other loads.

It is a further object to carry an infant more pleasurably and restfully, providing for better interaction between infant and user, continuous visual contact with the infant, a greater variety of riding positions, protection from branches protruding into the path, better control of the vehicle, and a safer ride, while both running and walking, on trails and smooth surfaces, than in previous devices.

It is a further object of the invention to provide a vehicle which can be controlled actively by the user sufficiently to compensate for unexpected movement by an active infant and for larger variation in the surface traveled .

It is a further object of the invention to improve the handles, to provide better control about the axis of rotation of the wheel, and transmit pushing force through the palms. Handles provide leverage in the plane of the grip.

It is a further object of the invention to eliminate mechanical connection of the vehicle to the user's body to reduce transfer of shocks from one to the other, and to allow the arms to absorb shock actively.

To accomplish these objects, the present invention comprises a frame, which frame comprises two tubular members, extensibly joined. The internal diameter of one is equal to or slightly greater than the external diameter of the other, and the smaller diameter tube is inserted into the larger, secured adjustably by clamping means, and detachable for transport and storage. At one end of the frame is a fork, within which is secured a ground-engaging bicycle-type wheel, and at it's other end a handlebar. This handlebar comprises a horizontal portion and two substantially vertical grips and extensions thereto which may be pivoted to the side to provide a hand-hold for use in the towed position, by which handlebar the apparatus is pushed or pulled by the user. This handlebar is adjustable in relation to the frame rotatably about the long axis of the vehicle, extensibly along that axis, and rotatably in the vertical plane.

A load-supporting bracket is adjustably mounted on said frame. It comprises a substantially horizontal "u" shaped tube member attached at it's open end adjustably to the frame, and a pair of substantially vertical tubes which attach to the fork at the wheel axle and to the "u" member adjustably at it's closed end on each side, by use of a pivoting joining part such as a bolt. All of which adjustments used together allow the load to be placed over the axle, and control of load-tilt relative to the horizontal.

A pair of stabilizing wheels are mounted on a pair of legs which are alternately locked down in an operative, ground-engaging position, or up in a stowed position, which legs are removable. These wheels allow the vehicle to be used as a conventional carriage when ground conditions allow and support the vehicle in an upright position while parked.

To transport infants, a seat is mounted removably to said bracket, using attachments such as bolts and wingnuts, facing the user. The seat comprises a molded bucket, a handle across the open side, and a spring clip to hold an umbrella.

The back of said bucket member forms an anatomically-shaped surface allowing the bucket to be carried on a user's back by means of a pair of straps and a waist belt attached thereto.

BRIEF DESCRIPTION OF THE DRAWINGS

The present invention will be more fully understood by reference to the following detailed description when read in conjunction with the attached drawings wherein.

DESCRIPTION OF PREFERRED EMBODIMENT

Figure 1:
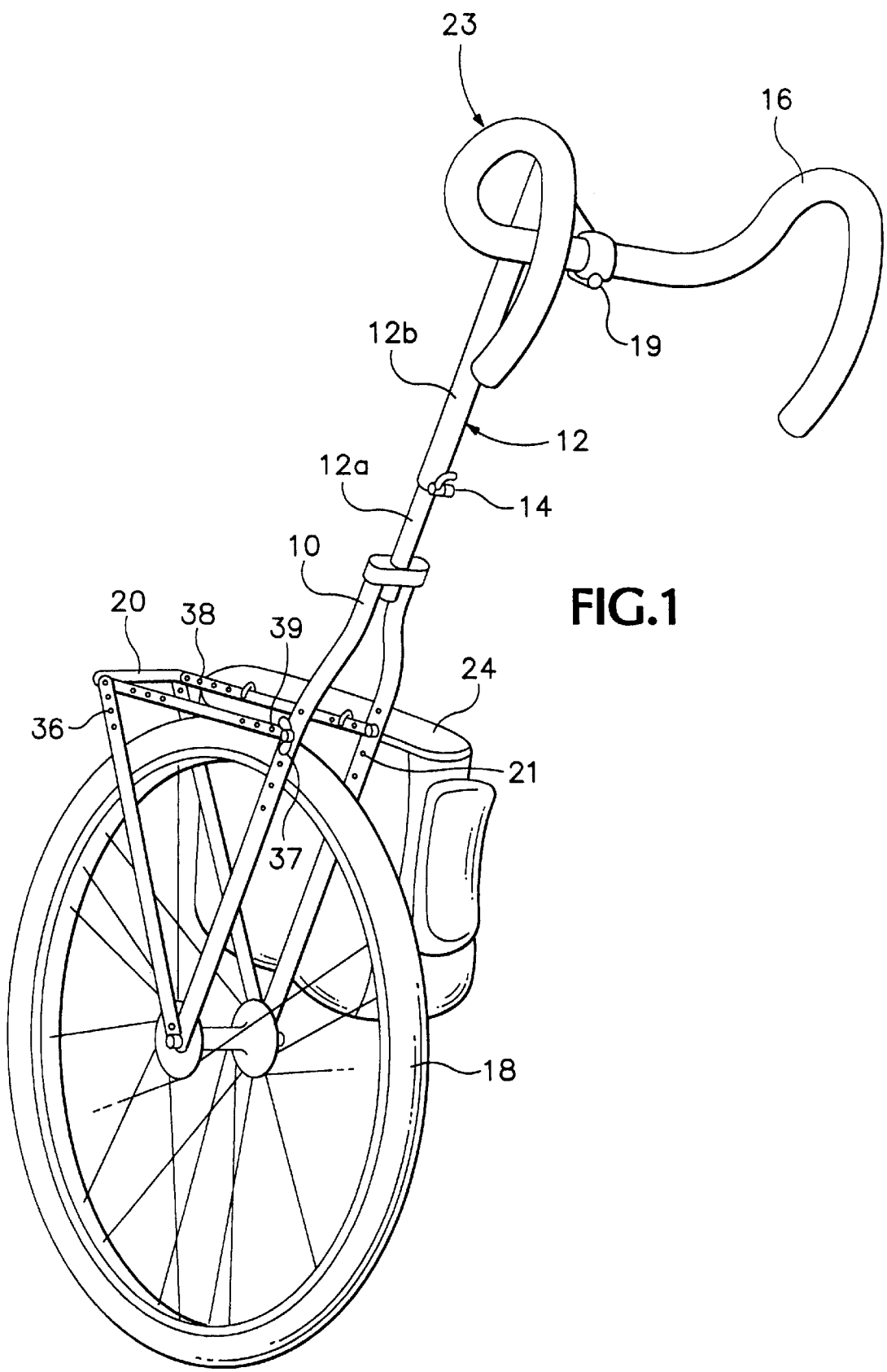
FIG. 1 is a perspective elevation view of a preferred embodiment of the carrier in use, with a load carried on the right side of the load-supporting bracket.

FIG. 1. shows a preferred embodiment of the present invention which comprises a wheel 18 joined to a tube 12 by a fork 10, both made of a strong material such as steel tubing. The tube includes two parts 12a, and 12b. Tube 12a is of slightly smaller diameter than tube 12b and is inserted into tube 12b which is cut along the axis of the tube from its end sufficiently to allow a clamping pressure, by means of a quick-release bolt 14, to retain the tube of smaller diameter. The fork 10 is joined to tube 12a fixedly. At the user-end of the frame tube 12b is secured a handlebar unit 23, mounted by inserting a mounting tube member of slightly smaller diameter into 12b and clamped therein in various positions around and extensibly along the longitudinal axis using an expansion bolt 17. Secured adjustably with a clamp at 19 is handle 16 so mounted that the gripping portion may be variously presented to the user in a substantially vertical orientation. This handle comprises a horizontal portion on which is mounted two substantially vertical grips which are "U"-shaped with the base of the U comprising the grip.

Figure 2:
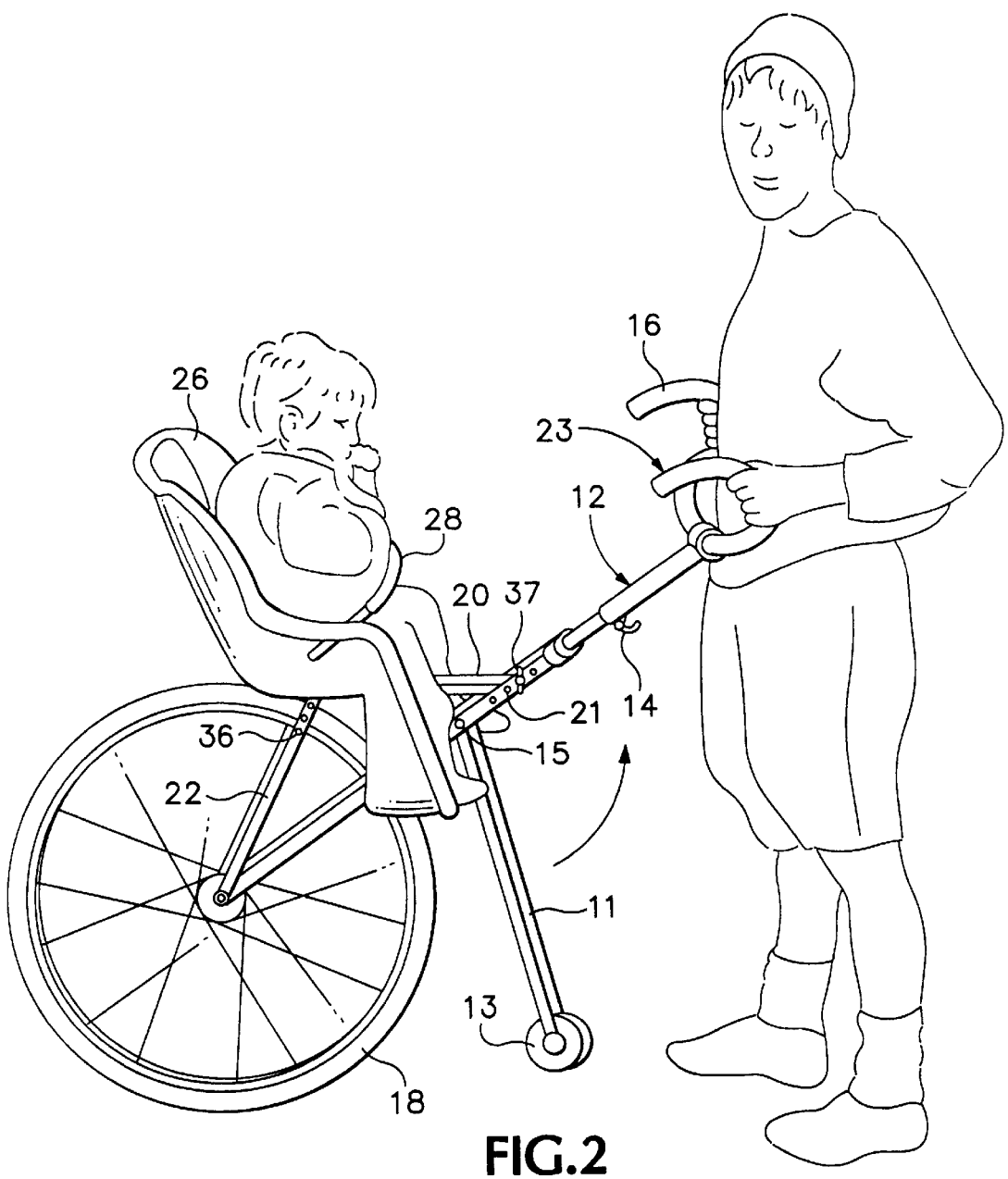
FIG. 2 is a perspective elevation view of the carrier in use with the child-seat attached, and with the stabilizing wheels in the down-locked position.

The load-supporting bracket 20 to which the load, either seat 26 or pack 24 is attached, is adjustably fastened through one of a series of spaced-apart holes 21 in fork 10 with bolts and wing-nuts 37. It comprises a single-piece "U"-shaped bracket 20, adjustably attached to the upper end of two upright tubes 22 which are themselves adjustably attached adjacent their lower ends to or near the wheel axle or the fork. To accommodate a variety of wheel sizes, the tilt of the bracket member, and to adjust the center of gravity of the load along the axis of the frame, the lengths of the three sides of the truss formed by members 10, 20, and 22 are adjustable. In FIG. 2 the carrier is configured with the seat 26 in place in accordance with a preferred embodiment of the invention. The seat 26 is mounted removably with bolts and wing-nuts to the horizontal bracket 20, facing the handlebar 16. The holes 21 and 39 are utilized to adjust the bracket 20 relative to the frame 10 and holes 36 and 38 to attach the bracket to the upright tubes 22 to place the center of gravity of the child or load directly over the axle of the wheel with a slight reclining tilt to the chair back relative to the vertical plane. Used together the three members 10, 20, and 22 can be assembled to create a truss of various sizes, adjustably mounted on the frame to accommodate the variety of loads described in the objects specification. The second handle used for riding "horsey" and lifting the carrier over obstacles is shown at 28. FIG. 2 shows the handlebar 16 pointing upwards. (as adjusted rotatably by loosening bolt 17) A pair of stabilizing wheels 13 may be pivoted and locked down on a pair of legs 11 to provide a stable carriage of conventional design. The legs are pivoted up parallel to the frame and locked when not in use by use of a "Velcro", hook and looptype, strap means 35. The pivoting legs 11 are attached to the frame by means of a pivoting bolt attachment 15.

Figure 3:
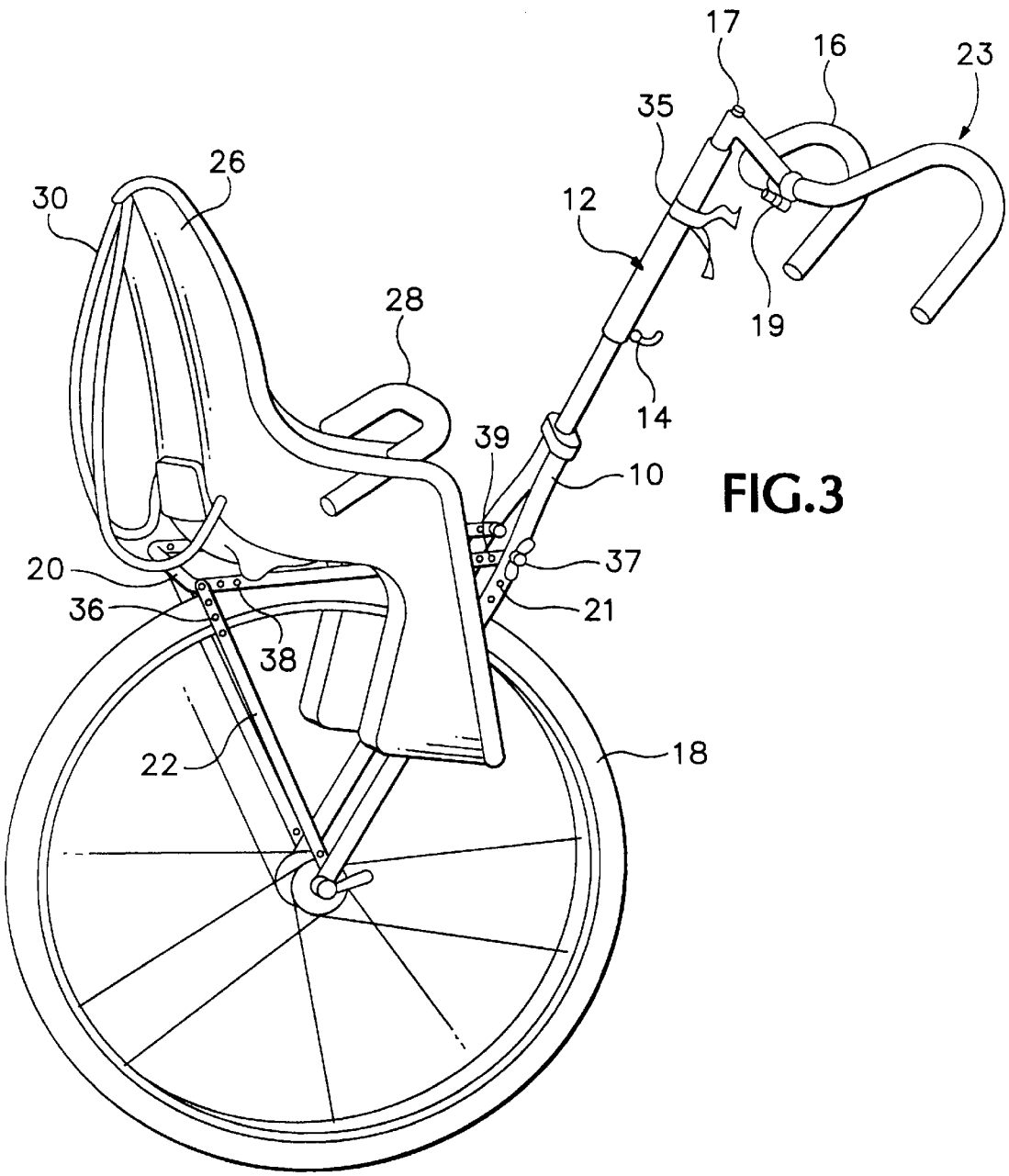
FIG. 3 is a perspective elevation of the carrier with the child-seat attached.

FIG. 3 shows the vehicle with the handlebars now adjusted pointing downwards. It also shows the provision of anatomical contours of the seat back and straps 30 to allow the seat to be carried comfortably on the user's back.

Figure 4:
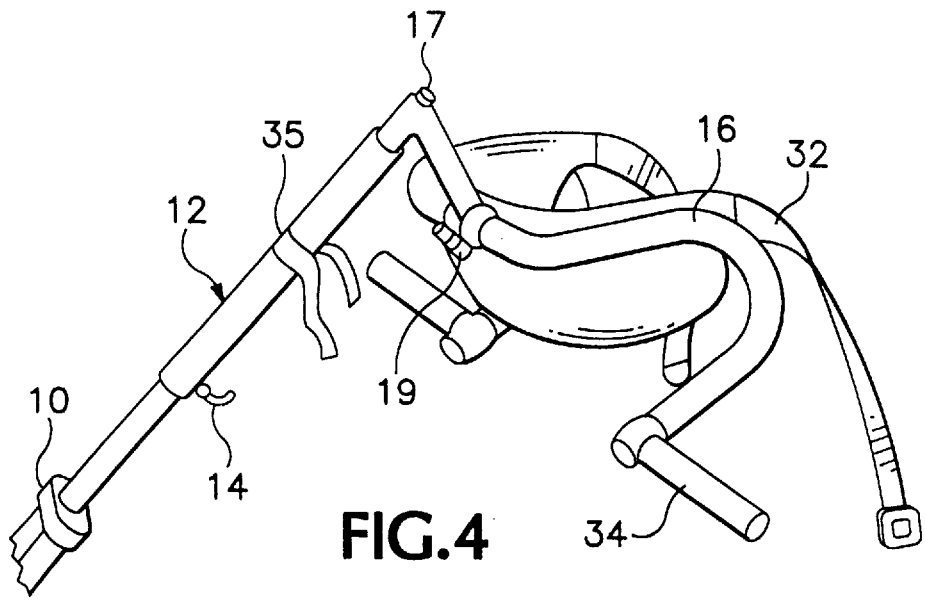
FIG. 4 is a detail of the user end of the carrier configured for towing.

FIG. 4 is a detail of the handlebars as configured for towing with a belt. The waist-belt 32 is attached removably to the handles 16 and is padded. A pair of handles 34 are mounted at the ends of the grips by clamping and are rotatable to, and clamped in a perpendicular, open position to receive the user's hands whereby the vehicle is stabilized in the towed position.

Figure 5:
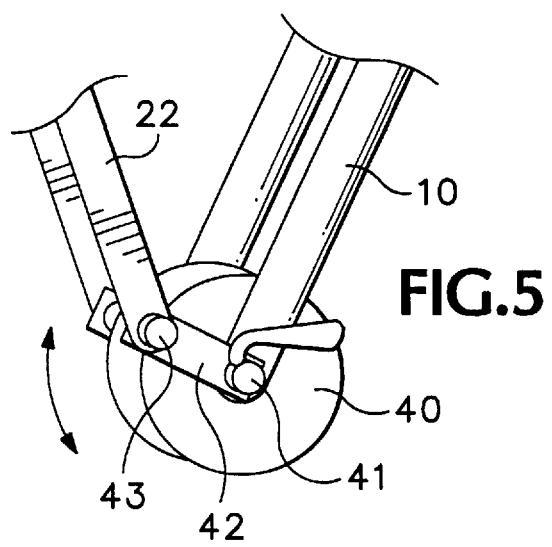
FIG. 5 is a detail of the mounting arm joining the rack upright members to the frame at the axle.

FIG. 5 shows an alternative embodiment for mounting the load supporting bracket adjustably to the frame. It shows the mounting plate 42 which is mounted rotatably on the wheel axle and fixed thereon by means of a quick-release clamp 41. The bracket upright members 22 are rotatably mounted to the plate using bolts 43. In use the plate allows adjustable mounting of a load supporting rack without adjusting the rack components using holes 36 and 38. It also allows the use of a conventional bicycle rack which lacks the adjustable members of the preferred embodiment while allowing for various wheel sizes, and rack placements.

Prior to use the vehicle will be adjusted to the needs of the user. The size of the wheel 18 will be chosen to match the anticipated terrain and load, a larger wheel for rougher terrain or a larger load. The length of the frame is adjusted by releasing clamp 14 and sliding the two tubes in or out of each other until the proper vehicle length which accommodates the user's stride is attained.

The seat is mounted for transport of an infant, and a load may also be attached on each side with the seat in place.

The load-supporting bracket is adjusted to provide a level platform for a load, or a slightly reclining position for a seat, by adjusting the position of bracket 20 on the frame by use of selected holes 21 and it's position over the wheel by use of similar holes on members 22 using holes 36. A bolt and wing-nut 37 or other fasteners are used to secure the bracket to the frame. The seat, when used, is fastened through selected holes in the bracket by use of bolts and wing-nuts or other means. A load may be fastened directly to the bracket, or any of a wide variety of commercially-available bags may be used to carry the load and fastened variously to the bracket.

The position of the handlebar is set to place the load directly over the wheel while the hands are in a comfortable position. The width of the handle is also chosen to allow the user a snug fit around the hips to provide a stable platform for holding the vehicle while inserting the child into the seat, or while towing the vehicle.

To load the vehicle the user extends and locks the stabilizing wheels. The vehicle may be used as a conventional carriage on suitable terrain, by placing the load center of gravity mid-way between the single wheel and the stabilizing wheels. On rough terrain the stabilizing wheels are pivoted up and secured against the frame.

To push the vehicle the user grips the handlebar on the vertical hand-grips, holding the hands above the waist so as to keep the center of mass of the load directly over the axle of the wheel and making small adjustments to maintain this relationship as the vehicle moves over uneven terrain.

Control of the vehicle is provided by the vertical grips, and control in the vertical plane is maximized. This is the plane in which one-wheeled vehicles are most difficult to stabilize.

Towing is the preferable position for traversing steep up-hill grades or very uneven sections of trail. To provide control in the towed position handles 34 are rotated out and locked on the handlebar on each grip. The handles extend at right angles to the long axis of the vehicle. In use the vehicle is towed by use of a belt 32 attached to the handlebars with control provided by the user's hands, which are placed on the handles and provide constant small correcting forces to the vehicle. When not in use, the handles are unlocked and swung into the plane of the vehicle for stowage.

A second handle on the seat allows lifting the vehicle with one hand to pivot it up, and over, large obstacles with the curved handlebar held against the user's body. A pair of ground-engaging wheels 13 may be pivoted and locked down on legs 11 to provide a stable carriage of conventional design. The legs are pivoted up parallel to the frame and locked when not in use, and may be entirely removed by removal of the mounting bolt from the fork.

The seat includes means for carrying on the user's back, with child aboard, while crossing terrain which is otherwise impassable using the loaded vehicle. In this embodiment, the means comprise an anatomical shape in the back of the seat which transfers the load to the lower back of the user, and shoulder straps. A framework can also be attached which would include a waist-belt.

This need occurs on rough trails with many large stones, or during stream-crossing and will make the vehicle safer for user and child if the seat is carried conveniently on the user's back. It also provides redundancy in the event the vehicle becomes inoperable.

The vehicle will also provide a stable platform to substitute as a dolly for a movie or video camera. The unusual degree of control and stability provided by the vehicle will allow it's use to carry a camera while filming, on terrain which is otherwise too rough to allow the use of a multi-wheeled dolly.

The vehicle will also provide a convenient means for the aged and disabled who need limited and occasional assistance in maintaining balance while walking. With a small wheel and the pair of stabilizing wheels extended, the vehicle will carry groceries and provide a stabilizing grip to help prevent falls and attendant injuries for the elderly who do not require a full walker. It will be convenient and small enough to be taken onto buses and inside stores and elevators.

While the reader skilled in the art will find the described embodiment fulfills the objects stated above, it is also clear that many other embodiments are anticipated by my invention.

I claim:

1. A vehicle for transporting loads over rough terrain comprising:

a) a longitudinally elongated frame member configured to extend generally along a first, longitudinal axis of extension, the frame member terminating in opposite, first and second longitudinal frame ends, said first longitudinal frame end terminating in and mounting a wheel axle member having a wheel axle rotatably mounting a single ground-engaging wheel, and said opposite, second longitudinal frame end terminating in and mounting a handlebar member, the handlebar member mounting a laterally spaced apart pair of hand grip members configured to project from the handlebar member on axes of extension that are other than and disposed angularly relative to said first, longitudinal axis of extension of the frame member, and b) a load-supporting bracket member mounted on the frame member and configured to receive a load to be transported, said load-supporting bracket member further configured for adjustment on the frame member to position the bracket member thereon to substantially balance a load supported by the bracket member directly over said wheel axle during load-transporting operation of the vehicle.

2. The vehicle of claim 1 wherein said elongated frame is telescopically adjustable intermediate its said longitudinally opposite ends to selectively adjust the length between the wheel and the handlebar.

3. The vehicle of claim 2 wherein said telescoping adjustable frame comprises two tube members, the internal diameter of one equal to or greater than the external diameter of the other, and the smaller diameter tube inserted into the larger, secured adjustably by clamping means.

4. The vehicle of claim 1 wherein said wheel axle member comprises a fork member having an axle configured to releasably and interchangeably mount ground-engaging wheels of different diameters.

5. The vehicle of claim 4 wherein said bracket member comprises a substantially "U"-shaped member adjustably mounted at its open end to the frame and adjustably mounted adjacent its closed end to a substantially upright pair of elongated members attached to the fork member of the frame at the mount for the wheel.

6. The vehicle of claim 4 wherein said bracket member comprises a substantially "U"-shaped member adjustably mounted at its open end to the frame and attached at its closed end a substantially upright pair of elongated members attached rotatably at their lower ends to the axle of said wheel by a mounting plate.

7. The vehicle of claim 1 wherein said handlebar member terminates in a pair of substantially perpendicularly-extending handgrips, and the handlebar member is mounted on the frame for retention thereon between releasably locked positions in which the handgrips are secured in a desired operative orientation facing upwardly or downwardly relative to the user.

8. The vehicle of claim 7 wherein said handlebar member comprises a horizontal member mounted on the frame for selectable rotation about an axis extending substantially perpendicular to the axis of the frame, and wherein said handgrips comprise a pair of "U"-shaped members.

9. The vehicle of claim 8 wherein said handlebar member includes a second handle member mounted pivotally adjacent the terminal end of at least one of the handgrips for movement between a folded, stored position and an operative position extending substantially perpendicular to the plane of the handgrip.

10. The vehicle of claim 1 including a stabilizing unit comprising leg members attached to said frame, and at least one stabilizer wheel mounted thereon, said leg members attached to said frame member for movement of the leg members on the frame member between an extended, operative condition in which the leg members extend from the frame member to an operative position in which the stabilizer wheel engages the ground to stabilize the vehicle supported on its said ground-engaging wheel, and a retracted, inoperative condition in which the leg members are moved on the frame member to an inoperative position in which the stabilizer wheel is retracted away from said ground-engaging condition.

11. The vehicle of claim 1 wherein said load-supporting bracket member is configured to receive and mount a child carrier seat member.

12. The vehicle of claim 11 wherein the outer surface of the back of the said seat member is complementarily shaped to receive a user's back by use of straps attached thereto.

13. A vehicle for transporting infants and other loads over rough terrain comprising;

a) a longitudinally elongated frame having a pair of opposite longitudinal ends, the frame comprising: two tube members telescopically extensible and secured adjustably by clamping means, a fork member on one longitudinal end of said frame configured to releasably and interchangably mount a ground-engaging wheel of a variety of diameters, and, mounted perpendicularly at the opposite longitudinal end of said frame a handlebar member compising: a horizontal member mounted on the frame for selectable rotation about an axis extending substantially perpendicular in the horizontal plane to the axis of the frame and a pair of handgrips substantially perpendicular to the frame in the vertical plane comprising a pair of "U"-shaped members, including a second handle member mounted pivotally adjacent the terminal end of at least one of the handgrips for movement between a folded, stored position and an operative position extending substantially perpendicular to the handgrip in the horizontal plane, and said handlebar member is mounted on the frame for retention thereon between releasably locked positions in which the handgrips are secured in a desired operative orientation facing upwardly or downwardly relative to the user, and said frame including a pair of stabilizing units comprising leg members pivotally attached to said frame, and wheels mounted thereon, said leg members movable to and lockable in an operative, downwardly extending position in which said wheels engage the ground to stabilize the vehicle against tipping, and movable to an inoperable, stowed position, and, b) a load-supporting bracket member mounted on the frame and configured to receive a load to be carried, said bracket member being adjustably mounted on the frame to permit positioning of the load substantially directly over the wheel, and comprising a substantially "U"-shaped member adjustably mounted at its open end to the frame and mounted adjacent its closed end to a substantially upright pair of elongated members attached adjustably to the frame at the mount for the wheel, said bracket member further configured to receive and releasably mount a seat member for a child facing the user, and said child seat member, the outer surface of the back of the seat member is complementarily shaped to receive a user's back by use of straps attached thereto.

* * * * *